UNITED STATES PATENT OFFICE.

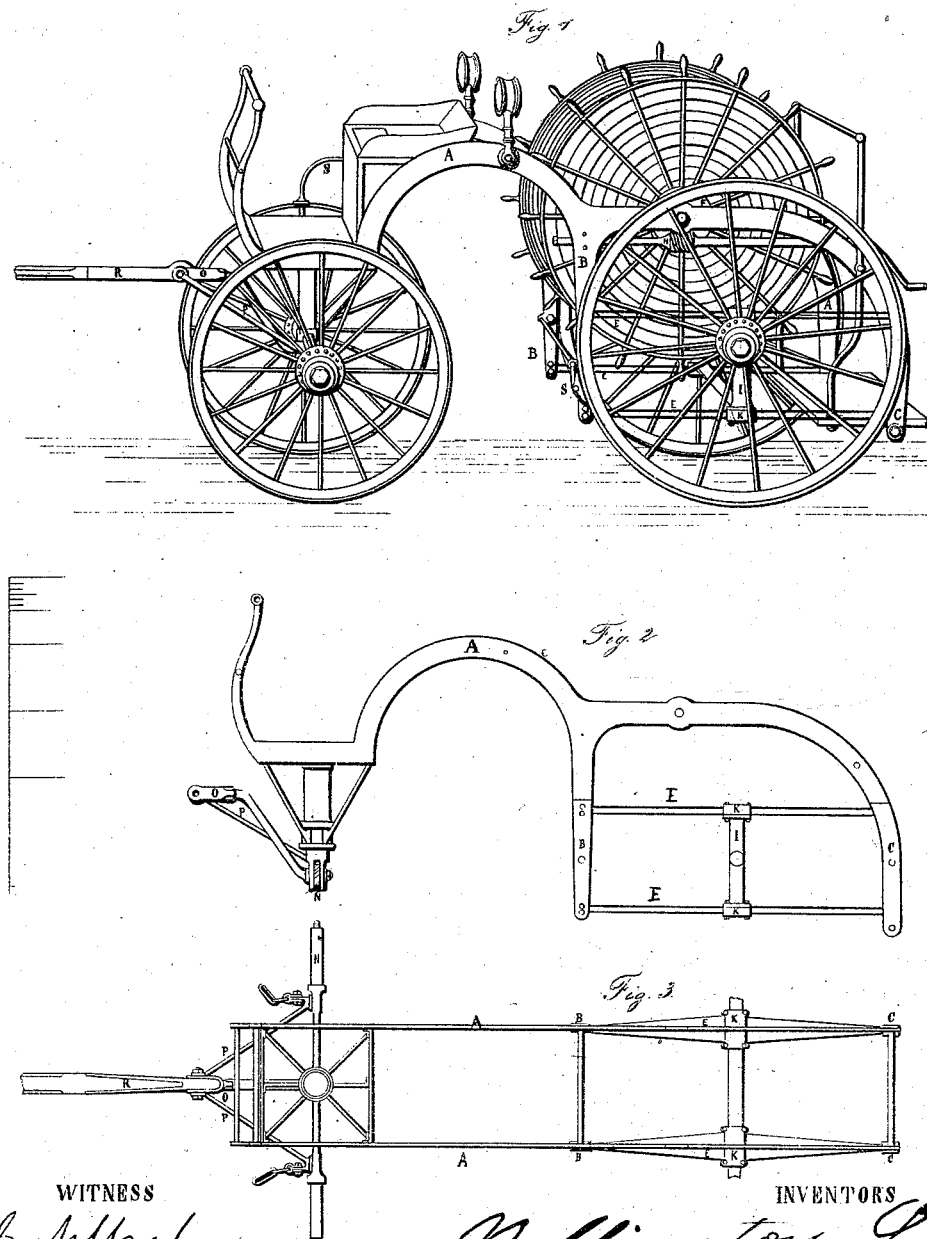

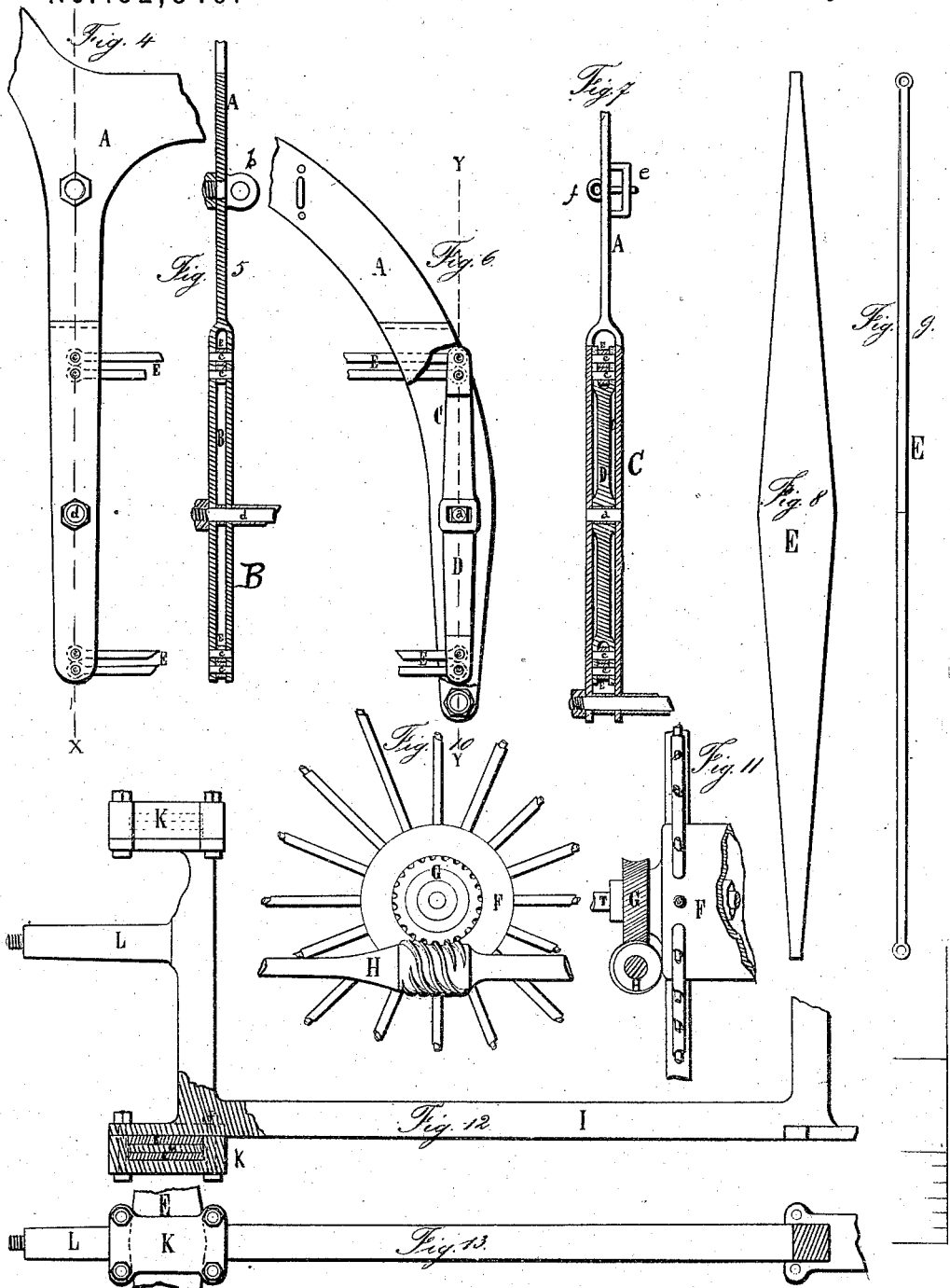

WELLINGTON LEE, OF NEW YORK, N. Y., AND JOHN A. KLEY, OF CHICAGO, ILLINOIS, ASSIGNORS TO THE BABCOCK MANUFACTURING COMPANY.

IMPROVEMENT IN HOSE-CARRIAGES.

Specification forming part of Letters Patent No. 152,849, dated July 7, 1874; application filed March 14, 1874.

*To all whom it may concern:*

Be it known that we, WELLINGTON LEE, of the city of New York, in the county and State of New York, and JOHN A. KLEY, of the city of Chicago, in the county of Cook and State of Illinois, have invented new and useful Improvements in Hose-Carriages, of which the following is a full description, reference being had to the accompanying drawings, consisting of two sheets, in which—

Figure 1 is a perspective; Fig. 2, a side elevation of the bed-frame; Fig. 3, a top or plan view of the same; Fig. 4, a side view of the front standard of the reel-frame; Fig. 5, a transverse vertical section of the same on line $xx$ of Fig. 4; Fig. 6, a side view of the rear standard of the reel-frame, with one branch of the fork removed; Fig. 7, a transverse vertical section on line $yy$ of Fig. 6; Figs. 8 and 9, top and edge view of the carrying-spring; Figs. 10 and 11, end and side view of the drum or hub of the hose-reel, showing the wheel and drum movement; and Figs. 12 and 13, side elevation and plan view of the rear axle, partly in section.

The object of our invention is to make a hose-reel carriage so that the reel will be nearer the ground and less liable to capsize, and to simplify its parts so as to make it more efficient and more easily handled than those heretofore in use; and its nature consists in an improved bed-frame, in an improved mode of attaching the springs, in an improved mode of operating the reel, and in the several devices and combinations hereinafter claimed.

In the drawings, A represents the top or main bar of the bed-frame; B, the front standards of the spring-frame; C, the reel-standards; D, pivoted bars for connecting the upper and lower springs together; E, the spring; F, the drum or hub of the hose-reel; G, the worm-wheel; H, the worm; I, bent portion of the axle; K, sockets or lock for securing the springs; L, short axles, to which the rear wheels are attached; M, plate for separating the springs E; N, front axle; O, draft-bar; P, braces for the draft-bar; R, the tongue; S, brake; T, journal of the hose-reel; $a$, pivotal pin of the bar D; $b$, front pivoted bearing for the worm-shaft H; $c$, pivotal pin for connecting the springs E with the bar D; $f$, pin for throwing the worm H in or out of gear; $e$, rear bearing of the worm-shaft; and $d$, cross-rod.

The bed-frame A is made of iron, and is provided with standards B C, which are forked, as shown at Figs. 5 and 7, for the purpose of affording additional security to the springs, and for keeping them in position. The springs E are made of single blades, of a form tapering to correspond with leverage; and in order to get sufficient strength we have applied them double, as shown. These springs are fitted in a lock or socket, K, which is made to closely fit the angle at the middle of the spring, as shown by the dotted line in Fig. 13. The lower spring is inserted in place, the plate $m$ is then placed upon it, when the upper one is placed in position, and the whole bolted together, as shown in section at Fig. 12. By interposing the plate M all friction and wear between the springs is avoided. The springs, at their outer ends, are provided with eyes, and attached to the bars D by the pins $c$, as shown at Fig. 6. The movement at the outer ends of the springs E has a tendency to cause the bars D to approach each other, and this tendency is compensated for by elongating the mortise or opening at the center of the bar, as shown at $a$, Fig. 6. This leaves the springs free to act under all circumstances, which gives the carriage a free and easy movement upon them. The springs are attached to the rear axle above and below the short axles upon which the wheels revolve, as shown at Fig. 12, and by carrying down a portion of the axle I, as shown at said figure, we are enabled to hang the reel much lower than it has been heretofore done, and at the same time give a perfect operation to said springs. The reel is made in the usual form, except that at its outer ends we have provided worm-wheels G, which engage with worms H placed on the shafts running to the reel, so that the reel can be operated by these worms from the rear end of the cart. The worm-shafts are journaled at the front end into eyes or boxes $b$, to admit of a change of position, and at their rear ends they are journaled in an elongated opening or bearing, $e$, so that when raised at that point and resting on the pin $f$ the worms H engage with the wheels, and when the pins are withdrawn, so that they rest at the bottom of $e$, the worms will be disengaged, and the hose can be run off without revolving the worm-shafts. The reel is provided with the usual handles, and the carriage with a driver's seat, rear platform, and lamps in the usual manner, except that the driver's seat and platform are wider, and three men can be carried on each, and also with a suitable brake.

The front wheels are attached to the bed-frame by means of a suitably-braced cylinder, containing a helical or volute spring, through which the king-bolt passes in the usual manner.

It will be observed that the bed-frame A, with its standards B and C, are forged together, so as to form one piece, and that the bar D is only placed in the standard C, which will ordinarily be found sufficient.

For light carriages one worm and wheel may be dispensed with.

What we claim as new is as follows:

1. The frame A B C, the parts B and C being slotted to receive the parts E and D, substantially as and for the purpose set forth.

2. The combination of the worm H and wheel G, with the reel F and frame A, substantially as and for the purpose specified.

3. The socket K, in combination with the parts L and E, substantially as described.

4. The combination of the springs E with the bent axle I, frame A, and bar D, substantially as described.

5. The bar D, provided with the slot and pin $a$, in combination with the part C, substantially as and for the purposes specified.

WELLINGTON LEE.
JOHN A. KLEY.

Witnesses:
E. A. WEST,
O. W. BOND.